US007313857B2

United States Patent
Kanaya et al.

(10) Patent No.: US 7,313,857 B2
(45) Date of Patent: Jan. 1, 2008

(54) METHOD OF MANUFACTURING A MAGNETO-RESISTIVE DEVICE

(75) Inventors: Takayasu Kanaya, Tokyo (JP); Takeo Kagami, Tokyo (JP)

(73) Assignee: TDK Corporation, Tokyo (JP)

( * ) Notice: Subject to any disclaimer, the term of this patent is extended or adjusted under 35 U.S.C. 154(b) by 534 days.

(21) Appl. No.: 10/862,413

(22) Filed: Jun. 8, 2004

(65) Prior Publication Data

US 2004/0264068 A1    Dec. 30, 2004

(30) Foreign Application Priority Data

Jun. 24, 2003    (JP)    ............................. 2003-179036

(51) Int. Cl.
  *G11B 5/127*    (2006.01)
  *H04R 31/00*    (2006.01)
(52) U.S. Cl. .............................. 29/603.16; 29/603.11; 29/603.14; 29/603.15; 29/603.18; 216/22; 216/39; 216/40; 360/324.12; 360/324.2; 427/127; 427/128; 451/5; 451/41
(58) Field of Classification Search ............................. 29/603.11–603.16, 603.18; 360/324.12, 360/324.2; 216/22, 39, 40; 427/127, 128; 451/5, 41
See application file for complete search history.

(56) References Cited

U.S. PATENT DOCUMENTS 5,122,483 A    6/1992    Sakai et al.

| 6,473,257 B1 | 10/2002 | Shimazawa et al. |
| 6,624,987 B1 | 9/2003 | Hayashi et al. |
| 6,787,369 B2 | 9/2004 | Ishii et al. |
| 6,839,205 B2 | 1/2005 | Kagami et al. |
| 6,847,510 B2 * | 1/2005 | Childress et al. ........ 360/324.2 |
| 6,992,870 B2 * | 1/2006 | Kagami et al. .......... 360/324.2 |

FOREIGN PATENT DOCUMENTS

| JP | 03-202461 A | 9/1991 |
| JP | 2002-163809 A | 6/2002 |
| JP | 2002-365590 A | 12/2002 |
| JP | 2003-060262 A | 2/2003 |

* cited by examiner

*Primary Examiner*—Paul D. Kim
(74) *Attorney, Agent, or Firm*—Oliff & Berridge, PLC

(57) ABSTRACT

A method of manufacturing a magneto-resistive device is provided for reducing a degradation in device characteristics due to annealing. The method includes the steps of depositing constituent layers, which make up a magneto-resistive layer on a base, patterning one or more layers of the constituent layers, forming an insulating layer in a region in which the one or more layers of the constituent layers have been removed by the patterning. For forming the insulating layer, the insulating layer is deposited while irradiating an ion beam of a gas mainly containing a rare gas toward the base after the step of patterning.

4 Claims, 7 Drawing Sheets

METHOD OF MANUFACTURING A MAGNETO-RESISTIVE DEVICE

BACKGROUND OF THE INVENTION

The present invention relates to a method of manufacturing a magneto-resistive device, and a magnetic head, a head suspension assembly and a magnetic disk apparatus.

With the trend to a larger capacity and a smaller size of hard disk drives (HDD), heads are required to have a higher sensitivity and a larger output. To meet these requirements, strenuous efforts have been made to improve the characteristics of GMR heads (Giant Magneto-Resistive Head) currently available on the market. On the other hand, intense development is under way for a tunnel magneto-resistive head (TMR head) which can be expected to have a resistance changing ratio twice or more higher than the GMR head.

Generally, the GMR head differs from the TMR head in the head structure due to a difference in a direction in which a sense current is fed. A head structure adapted to feed a sense current in parallel with a film surface, as in a general GMR head, is referred to as a CIP (Current In Plane) structure, while a head structure adapted to feed a sense current perpendicularly to a film surface, as in the TMR head, is referred to as a CPP (Current Perpendicular to Plane) structure. Since the CPP structure can use a magnetic shield itself as an electrode, it is essentially free from short-circuiting between the magnetic shield and a device (defective insulation) which is a serious problem in reducing a lead gap in the CIP structure. For this reason, the CPP structure is significantly advantageous in providing a higher recording density.

Other than the TMR head, also known as a head in CPP structure is, for example, a CPP-GMR head which has the CPP structure, though a spin valve film (including a specular type and dual spin valve type magnetic multilayer films) is used for a magneto-resistive device.

Any type of CPP-based heads has an upper electrode and a lower electrode for supplying a current to a magneto-resistive layer formed on a base, formed on the top (opposite to the base) and on the bottom (close to the base) of the magneto-resistive layer, respectively. The CPP-based head comprises an insulating layer for limiting a current path between the upper electrode and lower electrode is arranged around a main layer (for example, a tunnel barrier layer in a TMR head) of the magneto-resistive layer. The limited current path substantially matches an effective region for detecting a magnetic field from a magnetic recording medium. A TMR head is disclosed as an example of the CPP-based head in JP-A-2001-23131 corresponding to U.S. Pat. No. 6,473,257 and JP-A-2001-52316 corresponding to U.S. Pat. No. 6,624,987.

In a conventional general CPP-based head as disclosed in JP-A-2001-23131, an insulating layer for limiting a current path between an upper electrode and a lower electrode is generally made of $Al_2O_3$ or $SiO_2$.

Generally, for manufacturing a conventional CPP-based head as disclosed in JP-A-2001-23131, constituent layers formed on a substrate, which make up a magneto-resistive layer, are milled using a resist mask to pattern the constituent layers. Then, the resist mask is used as it is to form an insulating layer of $Al_2O_3$ or $SiO_2$ around the constituent layers by a lift-off method. During the formation of this $Al_2O_3$ or $SiO_2$, $Al_2O_3$ or $SiO_2$ is deposited by using an ion beam deposition system having an ion gun for irradiating a target and an assist gun (ion gun for assistant) so as to irradiate a target irradiation ion beam (for example, Ar ion beam) toward a target of $Al_2O_3$ or $SiO_2$ from the ion gun for irradiating the target, while irradiating an ion beam of a gas comprised of an Ar gas and an oxygen gas included in the Ar gas in large amount toward the substrate from the assist gun. Here, the assist gun is used to irradiate the ion beam of the gas including a large amount of oxygen gas toward the substrate for fear of poor insulation resulting from a shortage of oxygen atoms in the deposited insulating layer. Specifically, when $Al_2O_3$ is used as a target of an insulating layer by way of example, a difference in nature between the Al atoms and O atoms may cause a shortage of oxygen atoms in the deposited insulating layer, resulting in a difference in a composition ratio with respect to the stoichiometry which can make the deposited insulating layer poor in insulation. To eliminate this concern, the assist gun is used to supplementarily supply an ion beam of a gas including a large amount of oxygen gas to make up for a shortage of oxygen in the deposited insulating layer in order to prevent the poor insulation. Also, it has been thought in the past that a surplus amount of oxygen supplied during the deposition of an insulating layer would not cause any inconvenience.

It should be understood that generally, magnetic heads have not only a reproducing device such as a TMR device, a GMR device and the like, but also a recording device such as an inductive magnetic transducing device and the like, so that a composite magnetic head is typically provided for reproducing and recording magnetic information. During manufacturing of such a composite magnetic head, generally, a reproducing device is formed on a substrate before a recording device is laminated thereon. Then, annealing is performed as a photoresist curing step when a coil is fabricated during the fabrication of the recording device. For example, JP-A-2001-52316 describes that for manufacturing a composite magnetic head which has a recording device laminated on a TMR device, annealing is performed for two hours at 250° C. as a photoresist curing step during the fabrication of a coil of the recording device.

The result of a research made by the present inventors has revealed that the conventional magnetic heads as disclosed in JP-A-2001-23131 suffer from deteriorated characteristics of the TMR devices due to the annealing. In this regard, description will be made below.

The present inventors fabricated a magnetic head similar to the magnetic head disclosed in JP-A-2001-23131. In this magnetic head, a TMR device was formed as a reproducing device. In this event, constituent layers, which make up a magneto-resistive layer on a substrate, were patterned by milling the constituent layers using a resist mask, and the resist mask was used as it is to form $Al_2O_3$ as an insulating layer around the constituent layers by a lift-off method. During the formation of this $Al_2O_3$, $Al_2O_3$ is deposited by using an ion beam deposition system having a target irradiating gun and an assist gun so as to irradiate a target irradiating ion beam (for example, Ar ion beam) toward the target of $Al_2O_3$ or $SiO_2$ from the target irradiating gun, while irradiating an ion beam of a gas composed of an Ar gas and an oxygen gas included in the Ar gas in large amount toward the substrate from the assist gun. Also, for the magnetic head, an inductive magnetic transducing device was laminated on the TMR device as a recording device. Further, annealing was performed as a photoresist curing step during the fabrication of a coil of the recording device. In the course of the fabrication of the magnetic head, the fabricated TMR device underwent the first measurement of the characteristics thereof (the resistance and MR ratio of the TMR device) before the creation of the recording device on the fabricated TMR device. Then, the TMR device again underwent the second measurement of the characteristic thereof (the resistance and MR ratio of the TMR device) after the recording device had been created.

A comparison of the results of the first measurement with the results of the second measurement has revealed that the characteristics of the TMR device after the creation of the recording device were significantly deteriorated as compared with those before the creation of the recording device, contrary to an assumption that the characteristics of the TMR device would be the same before and after the creation of the recording device. Specifically, the resistance of the TMR device taken in the second measurement was higher than the resistance of the TMR device taken in the first measurement, while the MR ratio of the TMR device taken in the second measurement was lower than the MR ratio of the TMR device taken in the first measurement. The TMR device has a challenge of reducing the resistance of the device itself because noise proportionally increases as the resistance of the device is higher. Further, a higher MR ratio is desired because a reduced MR ratio causes a smaller head output.

The results of more detailed experiments made by the present inventors have revealed that the aforementioned deterioration in the characteristics of the TMR device (increased resistance and reduced MR ratio) are caused by the annealing performed for fabricating the recording device.

Magneto-resistive devices such as the TMR device have a variety of applications such as a magnetic detector, MRAM (Magnetic Random Access Memory), and the like, other than magnetic heads, and the annealing is sometimes involved in these applications.

SUMMARY OF THE INVENTION

It is an object of the present invention to provide a method of manufacturing a magneto-resistive device, which is capable of reducing the degradation in the device characteristics due to the annealing, as well as a magnetic head, a head suspension assembly, and a magnetic disk apparatus.

The result of a further research made by the present inventors has revealed that in a conventional magnetic head as disclosed in JP-A-2001-23131, the degradation in the characteristics of the TMR device (increased device resistance and reduced MR ratio) due to the annealing appears to be caused by oxygen attached on end surfaces of a magneto-resistive layer during the deposition of an insulating layer for limiting a current pass between an upper electrode and a lower electrode after patterning of the magneto-resistive layer, wherein the oxygen diffuses into the magneto-resistive layer (within a tunnel barrier layer, a pinned layer, a free layer, and the like) by the annealing to oxidize the magneto-resistive layer. During the deposition of the insulating layer, oxygen supplied from the assist gun excessively attaches to end surfaces of the magneto-resistive layer. Also, even without oxygen supplied from the assist gun during the deposition of the insulating layer, oxygen which has been present within a vacuum chamber as impurities may excessively attach to the end surfaces of the magneto-resistive layer, or when the target of the insulating layer is made of an oxide, oxygen emitted from the target can excessively attach to the end surfaces of the magneto-resistive layer.

From the result of the experiment made by the present inventors, it has been found that the degradation in the device characteristics due to the annealing can be reduced by blocking the supply of oxygen from the assist gun, which had been thought as indispensable for ensuring the insulating property of the insulating layer, or limiting the supply of oxygen to a very small amount during the deposition of the insulating layer, and instead irradiating an ion beam of a gas mainly containing a rare gas toward the substrate from the assist gun. Seemingly, this is because oxygen excessively attached to the end surface of the magneto-resistive layer is reduced due to synergy of the following two effects. One effect is that the oxygen supplied from the assist gun will not excessively attach to the end surfaces of the magneto-resistive layer by blocking the supply of oxygen from the assist gun or limiting the supply of oxygen from the assist gun to a very small amount. Another effect is that the ion beam of a rare gas irradiated from the assist gun toward the substrate prevents oxygen present within the vacuum chamber as impurities and/or oxygen emitted from the target from excessively attaching to the end surfaces of the magneto-resistive layer. Also, from the result of the experiment made by the present inventors, it has been found that a sufficient insulation performance can be ensured for the insulating layer to limit a current path between the upper electrode and lower electrode even if an ion beam of a rare gas is irradiated from the assist gun during the deposition of the insulating layer, while blocking the supply of oxygen from the assist gun or limiting the supply of oxygen from the assist gun to a very small amount.

The present invention has been made based on the novel knowledge as described above. A method of manufacturing a magneto-resistive device according to a first aspect of the present invention includes the steps of: depositing constituent layers which make up a magneto-resistive layer on a base, patterning one or more layers of the constituent layers, and forming an insulating layer in a region in which the one or more layers of the constituent layers have been removed by the patterning. The step of forming the insulating layer includes the step of depositing the insulating layer while irradiating an ion beam of a gas mainly containing a rare gas toward the base after the step of patterning.

According to this first aspect, in accordance with the aforementioned knowledge, it is possible to reduce the degradation of the magneto-resistive device (increased resistance and reduced MR ratio) due to the annealing.

In the gas mainly containing a rare gas, the ratio of the flow rate of the introduced rare gas to the total flow rate of the gas introduced is preferably at 85% or more, the ratio is more preferably 90% or more, and the ratio is further more preferably 93% or more. Since the gas mainly containing a rare gas contains the rare gas at high percentage unlike before, the gas may include an oxygen gas.

A method of manufacturing a magneto-resistive device according to a second aspect of the present invention is arranged in a manner that, in the first aspect, the step of depositing the insulating layer includes the steps of using an ion beam deposition system having a first gun and a second gun so as to irradiating a target irradiating ion beam toward a target of the insulating layer from the first ion gun while irradiating the ion beam of gas mainly containing the rare gas to ward the base from the second ion gun.

While the second aspect shows an example of the system for use in the step of depositing the insulating layer in the first aspect, the system usable in the first aspect is not limited to this example.

In method of manufacturing a magneto-resistive device according to a third aspect of the present invention is arranged in a manner that, in the first or second aspect, the insulating layer is made of an oxide.

When the insulating layer is made of an oxide, it seems that when the insulating layer is deposited by ion beam sputtering using the oxide as a target, oxygen attaching to end surfaces of the magneto-resistive layer include oxygen emitted from the target. Therefore, it is thought that the first and second aspects are significantly effective in reducing the degradation in the characteristics of the magneto-resistive device due to the annealing when the insulating layer is made of an oxide as in the third aspect.

In the first and second aspects, however, the insulating layer is not limited to an oxide, but may be made, for example, of a nitride. This is because even with the use of a nitride, oxygen and the like present within a vacuum chamber as impurities hardly attaches to the end surfaces of the magneto-resistive layer, so that the deterioration in characteristics due to the annealing can be effectively reduced for the magneto-resistive device. Also, with the insulating layer made of a nitride, when the insulating layer is deposited by ion beam sputtering using the nitride as a target, nitrogen emitted from the target and attaching to the end surfaces of the magneto-resistive layer also causes the degradation in the characteristics of the magneto-resistive device, as is the case with oxygen. However, since such nitrogen hardly attaches to the end surfaces of the magneto-resistive layer, the deterioration in characteristics due to the annealing can be effectively reduced for the magneto-resistive device.

In a method of manufacturing a magneto-resistive device according to a fourth aspect of the present invention is arranged in a manner that, in any of the first to the third aspects, the magneto-resistive device includes an effective region effectively involved in detection of magnetism in the magneto-resistive layer, wherein the effective region is a region in which a current flows in a direction substantially perpendicular to the film surface in the magneto-resistive layer.

The magneto-resistive device according to the fourth aspect shows an example which employs a CPP structure. Since the CPP structure requires an insulating layer for limiting a current path between the upper electrode and lower electrode, a large technical meaning lies in the reduced deterioration in the characteristics due to annealing.

A method of manufacturing a magneto-resistive device according to a fifth aspect of the present invention is arranged in a manner that, in the fourth aspect, the magneto-resistive layer includes a tunnel barrier layer formed on one surface side of a free layer, a pinned layer formed on one surface side of the tunnel barrier layer opposite to the free layer, and a pin layer formed on one surface side of the pinned layer opposite to the tunnel barrier layer.

While the fifth aspect shows an example in which the fourth aspect is applied to a TMR device, the fourth aspect is not limited to the TMR device but may be applied as well to a CPP-GMR device and the like.

A magnetic head according to a sixth aspect of the present invention includes a base, and a magneto-resistive device manufactured by a manufacturing method according to any of the first to fifth aspects, wherein the magneto-resistive device is supported by the base.

According to the sixth aspect, since the magnetic head uses the magneto-resistive device manufactured by the manufacturing method according to any of the first to fifth aspects, the magnetic head can reduce the deterioration in the characteristics of the magneto-resistive device due to annealing. Therefore, for example, when the magneto-resistive device is combined with another recording device to provide a composite magnetic head, it is possible to improve the characteristics of the magneto-resistive device, even if the device is annealed in the course of the manufacturing of the recording device, to achieve an increased S/N ratio of a read signal, and the like.

A head suspension assembly according to a seventh aspect of the present invention includes a magnetic head according to the sixth aspect, and a suspension for supporting the magnetic head mounted near a leading end thereof.

According to the seventh aspect, since the head suspension assembly employs the magnetic head according to the sixth aspect, the recording density can be increased for a magnetic disk apparatus or the like.

A magnetic disk apparatus according to an eighth aspect of the present invention includes a head suspension assembly according to the seventh aspect, an arm for supporting the head suspension assembly, and an actuator for moving the arm to position the magnetic head.

According to the eighth aspect, since the magnetic disk apparatus employs the head suspension assembly according to the seventh aspect, the recording density can be increased.

DETAILED DESCRIPTION OF THE EMBODIMENTS

In the following, a method of manufacturing a magneto-resistive device, and a magnetic head, a head suspension assembly, and a magnetic disk apparatus according to the present invention will be described with reference to the accompanying drawings.

First, an exemplary magnetic head which is manufactured by a manufacturing method including a method of manufacturing a magneto-resistive device according to a first embodiment of the present invention will be described with reference to FIGS. 1 to 5.

Figure 1:
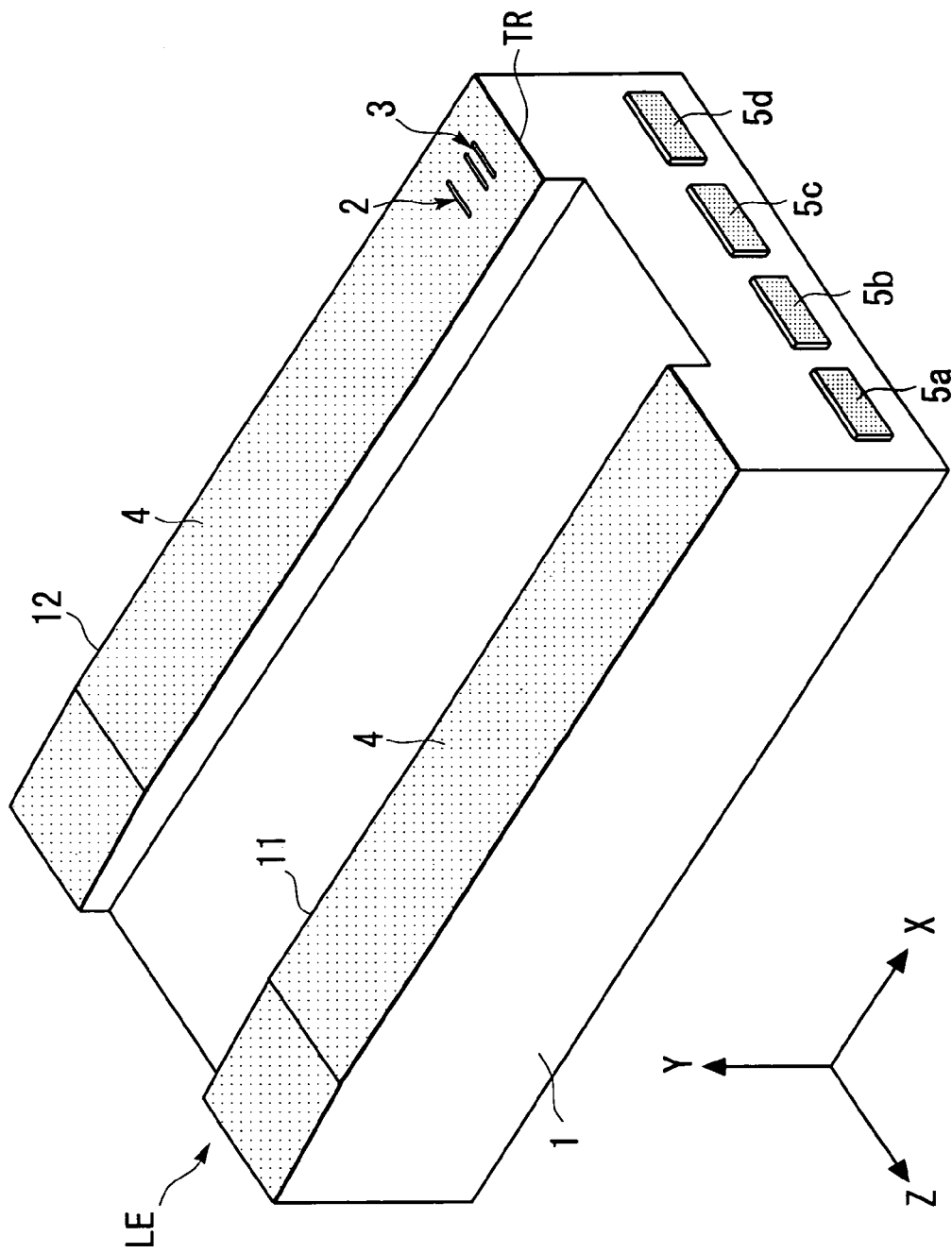
FIG. 1 is a general perspective view schematically illustrating an exemplary magnetic head which is manufactured by a manufacturing method including a method of manufacturing a magneto-resistive device according to a first embodiment of the present invention.
Figure 2:
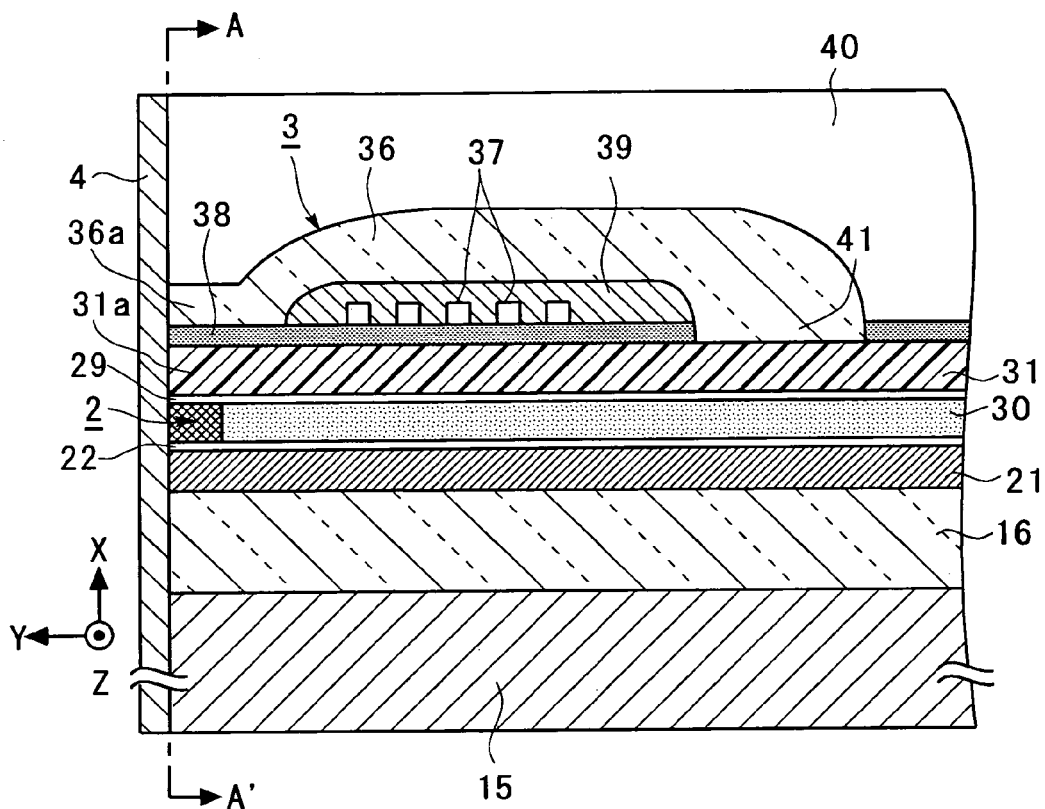
FIG. 2 is an enlarged cross-sectional view schematically illustrating a portion of a TMR device and an inductive magnetic transducing device in the magnetic head illustrated in FIG. 1.
Figure 3:
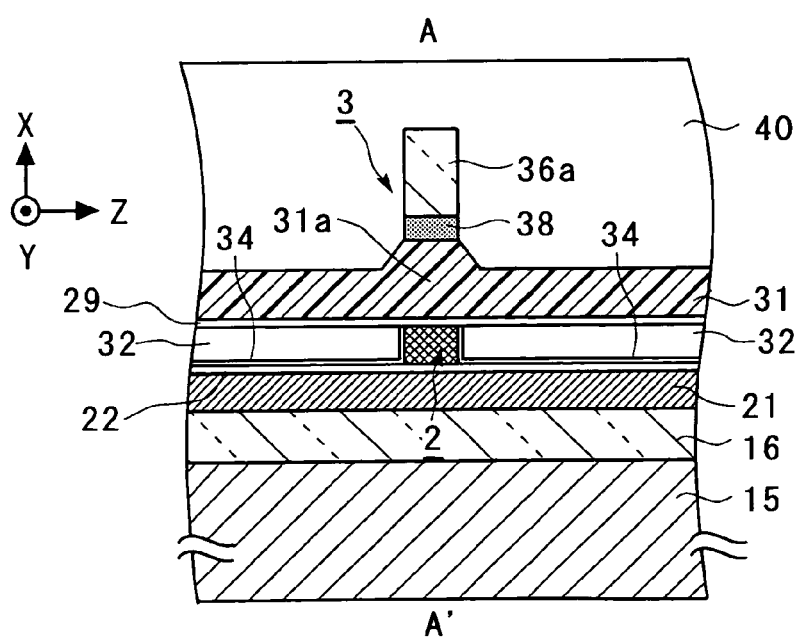
FIG. 3 is a general sectional view taken along a line A-A' indicated by arrows in FIG. 2.
Figure 4:
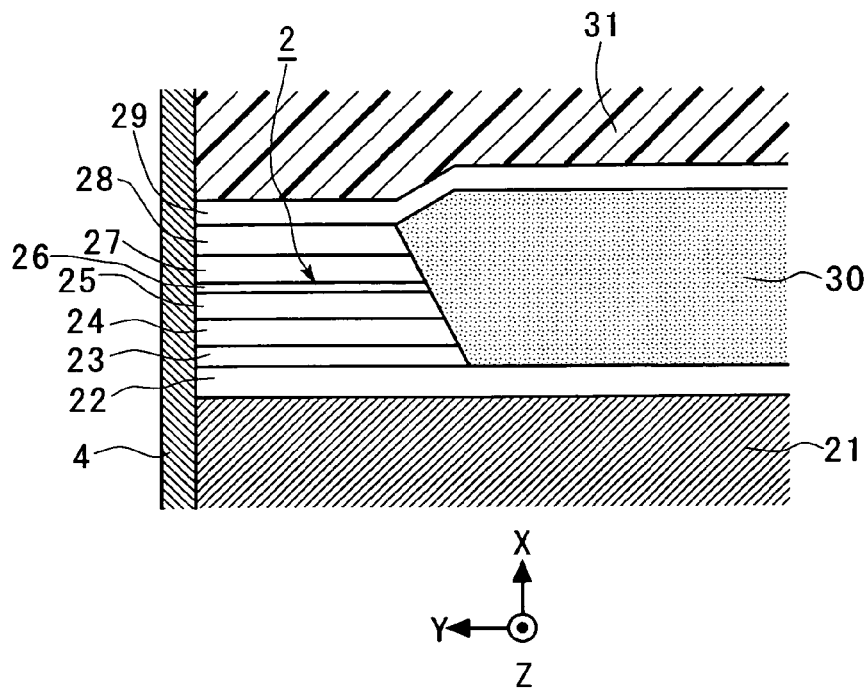
FIG. 4 is a further enlarged view around the TMR device in FIG. 2.
Figure 5:
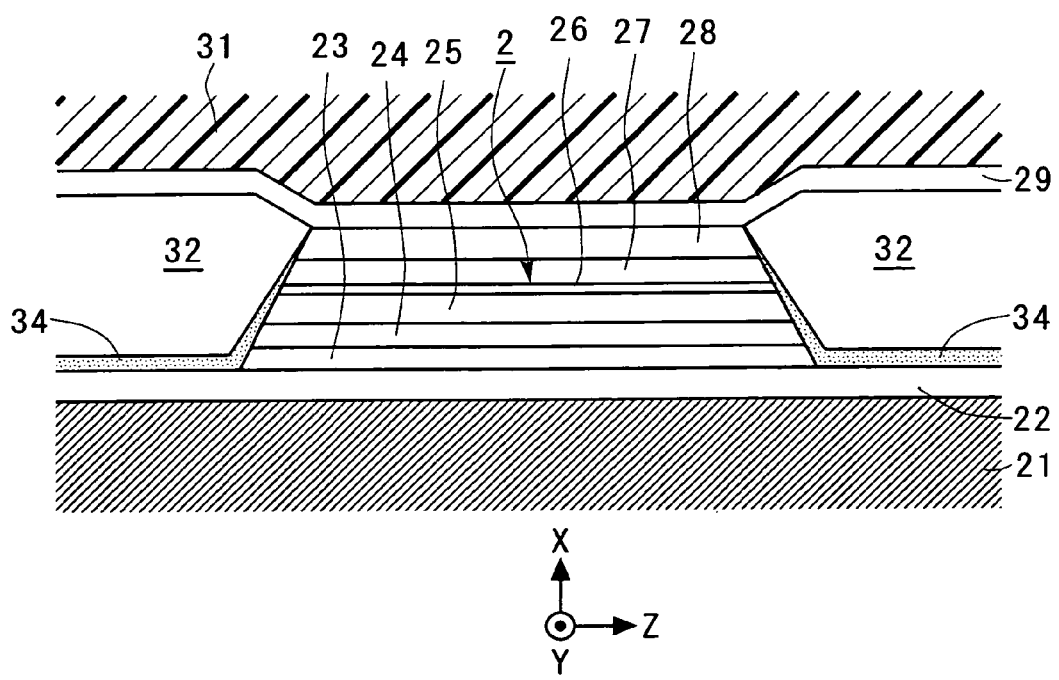
FIG. 5 is a further enlarged view around the TMR device in FIG. 3.

FIG. 1 is a general perspective view schematically illustrating the exemplary magnetic head which is manufactured by a manufacturing method including a method of manufacturing a magneto-resistive device according to the first embodiment of the present invention. FIG. 2 is an enlarged cross-sectional view schematically illustrating a portion of a TMR device 2 and an inductive magnetic transducing device 3 in the magnetic head illustrated in FIG. 1. FIG. 3 is a general sectional view taken along a line A-A' indicated by arrows in FIG. 2. FIG. 4 is a further enlarged view illustrating around the TMR device 2 in FIG. 2. FIG. 5 is a further enlarged view around the TMR device 2 in FIG. 3. For facilitating the understanding, an X-axis, a Y-axis and a Z-axis, orthogonal to one another, are defined as shown in FIGS. 1 to 5 (the same applies to figures later described). The Z-axis direction indicated by the arrow is referred to as the "+Z-direction" or "+Z-side," and the opposite direction is referred to as the "−Z-direction" or "+Z-side." The same is applied to the X-axis direction and Y-axis direction. The X-axis direction is the same as a direction in which a magnetic recording medium is moved. The Z-axis direction is the same as a track width direction of the TMR device 2.

As illustrated in FIG. 1, the magnetic head illustrated in FIGS. 1 to 5 comprises a slider 1 as a base; the TMR device 2 as a magneto-resistive device for use as a magnetic head device for reproduction; an inductive magnetic transducing device 3 as a magnetic head device for recording; and a protection film 4 made of a DLC film or the like, and is configured as a composite magnetic head. However, the magnetic head according to the present invention may comprise only the TMR device 2. Also, while the magnetic head of this example comprises one each of the devices 2, 3, the numbers of these devices are not limited in any sense.

The slider 1 has rails 11, 12 on a surface opposite to a magnetic recording medium, and the surfaces of the rails 11, 12 define air bearing surfaces (ABS). In the example illustrated in FIG. 1, there are two rails 11, 12, but the number of rails is not limited to two. For example, the slider 1 may have one to three rails, or the ABS may be a flat surface without rails. In addition, the ABS may be formed with a variety of geometric shapes for improving a floating characteristic and the like. The magnetic head according to the present invention may have any type of slider.

In this example, the protection film 4 is applied only on the surfaces of the rails 11, 12, so that the surface of the protection film 4 defines the ABS. Actually, the protection film 4 may be applied on the entire surface of the slider 1 opposite to a magnetic recording medium. While the protection film 4 is preferably provided, the protection film 4 may not be necessarily provided.

The TMR device 2 and inductive magnetic transducing device 3 are disposed on the rail 12 near an air outlet end TR, as illustrated in FIG. 1. A direction in which a recording medium is moved is identical to the X-axis direction in FIG. 1, and also identical to a direction in which air flows when the magnetic recording medium is rapidly moved. Air enters from an air inlet end LE and exits from the air outlet end TR. The slider 1 is provided on an end face of the air outlet end TR with bonding pads 5a, 5b connected to the TMR device 2, and bonding pads 5c, 5d connected to the inductive magnetic transducing device 3.

As illustrated in FIGS. 2 and 3, the TMR device 2 and inductive magnetic transducing device 3 are laminated on an underlying layer 16 deposited on a ceramic base 15 which constitutes the slider 1. The ceramic base 15 is generally made of AlTiC ($Al_2O_3$—TiC), SiC or the like. When $Al_2O_3$—TiC is used, an insulating film made, for example, of $Al_2O_3$ is used for the underlying layer 16 since $Al_2O_3$—TiC is electrically conductive. The underlying layer 16 may not be provided in some cases.

As illustrated in FIGS. 4 and 5, the TMR device 2 comprises a lower electrode 21 formed on the underlying layer 16; an upper electrode 31 formed overlying the lower electrode 21 (opposite to the base 15); and a lower metal layer (lower layer) 22, a lower metal layer (upper layer) 23, a pin layer 24, a pinned layer 25, a tunnel barrier layer 26, a free layer 27, and an upper metal layer (cap layer) 28 as a non-magnetic metal layer which serves as a protection layer, and an upper metal layer 29 as an underlying layer of the upper electrode 31 which are laminated in this order from the lower electrode 21 between the electrodes 21, 31. The pin layer 24, pinned layer 25, tunnel barrier layer 26 and free layer 27 constitute a magneto-resistive layer. While the actual TMR device 2 typically has a laminate structure compose of a larger number of layers, rather than the laminate structure composed of the number of layers as illustrated, the illustrated magnetic head represents a laminate structure minimally required for the basic operation of the TMR device 2 for simplifying the description.

In this example, the lower electrode 21 and upper electrode 31 are additionally used as a lower magnetic shield and an upper magnetic shield, respectively. The electrodes 21, 31 are formed of a magnetic material, for example, NiFe or the like. Though not shown, these electrodes 21, 31 are electrically connected to the aforementioned bonding pads 5a, 5b, respectively. It should be understood that a lower magnetic shield and an upper magnetic shield may be provided in addition to the lower electrode 21 and upper electrode 31.

The lower metal layer 22 is an electrically conductive material which is comprised, for example, of a Ta layer or the like. The lower metal layer 23 is an electrically conductive material which is comprised, for example, of an NiFe layer or the like. In this example, The lower metal layer 23 is formed only coextensively to the magneto-resistive layer, while the lower metal layer 22 widely extends over the electrode 21. Alternatively, the lower metal layer 23 may also be extended widely, or the lower metal layer 22 may be formed only coextensively to the magneto-resistive layer.

The pin layer 24, which is comprised of an antiferromagnetic layer, is preferably formed, for example, of an Mn-based alloy such as PtMn, IrMn, RuRhMn, FeMn, NiMn, PdPtMn, RhMn, CrMnPt, or the like. The pinned layer 25 and free layer 27 are each comprised of a ferromagnetic layer formed of such a material as Fe, Co, Ni, FeCo, NiFe, CoZrNb, FeCoNi, or the like. The pinned layer 25 has its magnetization direction fixed in a predetermined direction by an exchange bias magnetic field between the pinned layer 25 and the pin layer 24. On the other hand, the free layer 27 freely varies its magnetization direction in response to an external magnetic field which is basically magnetic information. The pinned layer 25 and free layer 27 are not limited to single-layers, but may implemented, for example, by a laminate comprised of a combination of a pair of magnetic layers in anti-ferromagnetic coupling and a non-magnetic metal layer sandwiched therebetween. Such a laminate may be formed, for example, of three ferromagnetic layers made of CoFe/Ru/CoFe. In this example, the pin layer 24, pinned layer 25, tunnel barrier layer 26 and free layer 27 are laminated in this order from the lower electrode 21. Alternatively, the free layer 27, tunnel barrier layer 26, pinned layer 25 and pin layer 24 may be laminated in this order from the lower electrode 21. The tunnel barrier layer 26 is formed, for example, of a material such as $Al_2O_3$, NiO, GdO, MgO, $Ta_2O_5$, $MoO_2$, $TiO_2$, $WO_2$, or the like.

The upper metal layer 28 is formed of a single-layer film or a composite-layer film made of simple Ta, Rh, Ru, Os, W, Pd, Pt, or Au, or an alloy made up of two or more of these elements in combination.

The upper metal layer 29, serving as the underlying layer of the upper electrode 31, is made of an electrically conductive material formed of a non-magnetic metal such as Ta or the like. In this example, the upper metal layer 29 is provided for holding a magnetic shield gap (a gap between the electrodes 21, 31) of a desired dimension. However, the upper metal layer 29 may not be provided.

As illustrated in FIGS. 3 and 5, vertical biasing layers (magnetic domain control layers) 32 for applying a biasing magnetic field to the free layer 27 for magnetic domain control are formed on both sides of the magneto-resistive layer in the Z-axis direction. The vertical biasing layers 32 are formed, for example, of a hard magnetic material such as Cr/CoPt (cobalt platinum alloy), Cr/CoCrPt (cobalt chromium platinum alloy), TiW/CoPt, TiW/CoCrPt, or the like. Alternatively, each of the vertical biasing layers 32 may be, for example, a layer using an switched connection in which a soft magnetic layer and an anti-ferromagnetic layer are laminated. An insulating layer 34 is formed below each of vertical biasing layers 32. The insulating layer 34 also intervenes between end faces of the associated vertical biasing layer 32 and layers 23-28 on the +Z-side and −Z-side, such that the layers 23-28 are not electrically short-circuited by the vertical biasing layer 32. Also, in a region where the vertical biasing layers 32, 34 are not formed, an insulating layer 30 is formed between the lower metal layer 22 and the upper metal layer 29. The insulating layer 30 covers an end surface on the —Y side of the layers 23-28. The insulating layers 34, 30 are made of $Al_2O_3$, $SiO_2$ or the like. Alternatively, both or one of the insulating layers 34, 30 may be made of a nitride or the like such as AlN.

In this example, the insulating layer 34 on the +Z-side and −Z-side of the magneto-resistive layer, as well as the insulating layer 30 on the —Y-side of the magneto-resistive layer comprise an insulating layer which is formed to be in contact with an effective region effectively involved in the detection of magnetism in the magneto-resistive layer (in this example, a region in which a current flows in a direction substantially perpendicular to the film surface in the magneto-resistive layer), without overlapping with this effective region.

As illustrated in FIGS. 2 and 3, the inductive magnetic transducing device 3 comprises the upper electrode 31 which is additionally used as a lower magnetic layer for the device 3; an upper magnetic layer 36; a coil layer 37; a write gap layer 38 made of alumina or the like; an insulating layer 39 made of a thermosetting photoresist (for example, an organic resin such as a novolac resin); a protection layer 40 made of alumina or the like, and the like. NiFe, FeN or the like, for example, is used as a material for the upper magnetic layer 36. Leading ends of the upper electrode 31, which is additionally used as the lower magnetic layer, and the upper magnetic layer 36 are formed as a lower pole 31a and an upper pole 36a which oppose each other through the write gap layer 38 made of alumina or the like in an infinitesimal thickness. The lower pole 31a and upper pole 36a write information on a magnetic recording medium. The upper electrode 31, which is additionally used as the lower magnetic layer, and the upper magnetic layer 36 are coupled to each other at a joint 41 at which a yoke is opposite to the lower pole 31a and upper pole 36a so as to complete a magnetic circuit. Within the insulating layer 39, a coil layer 37 is formed such that it is spirally wound around the joint 41 of the yoke. The coil layer 37 has both ends electrically connected to the bonding pads 5c, 5d. The coil layer 37 is arbitrary in the number of turns and the number of layers. Also, the inductive magnetic transducing device 3 may be arbitrary in structure. The upper electrode 31 may be divided into two layers across an insulating layer made of $Al_2O_3$, $SiO_2$ or the like in order to separate the role of the lower magnetic layer in the inductive magnetic transducing device 3 from the role of the upper electrode in the TMR device 2.

Next, the method of manufacturing a magnetic head including the method of manufacturing a magneto-resistive device according to the first embodiment will be described, by way of example, in connection with a method of manufacturing the magnetic head illustrated in FIGS. 1 to 5 described above.

First, a wafer process is performed. Specifically, a wafer 101 made of $Al_2O_3$—TiC, SiC or the like is provided for making a base 15. Using the thin film forming technology and the like, the aforementioned layers are formed in a large number of magnetic head forming regions in matrix on the wafer 101 to provide the aforementioned structure.

Figure 7A:
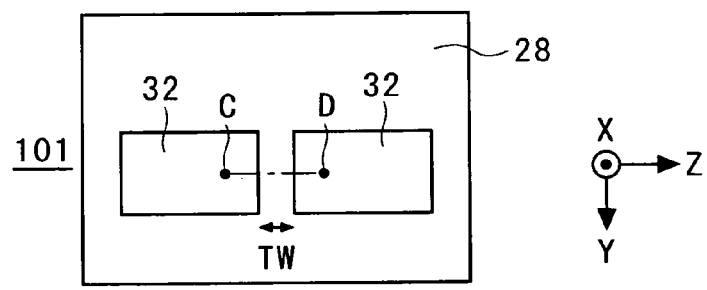
FIGS. 7A and 7B are diagrams schematically illustrating another step in the magnetic head manufacturing method which includes the method of manufacturing a magneto-resistive device according to the first embodiment of the present invention.
Figure 7B:
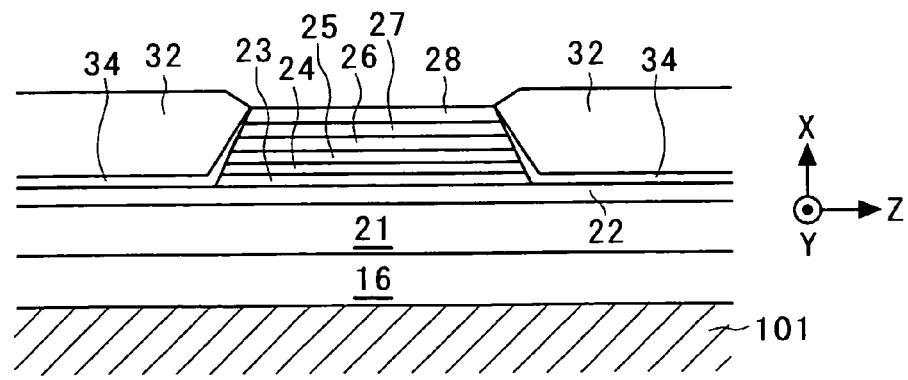
Figure 8A:
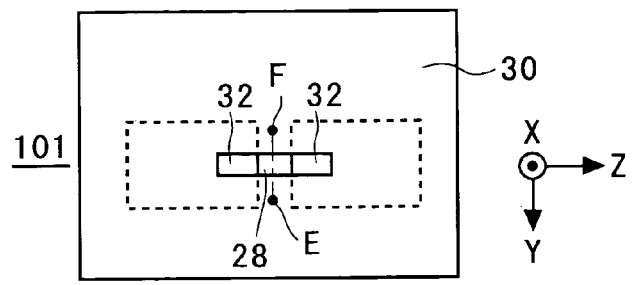
FIGS. 8A and 8B are diagrams schematically illustrating a further step in the magnetic head manufacturing method which includes the method of manufacturing a magneto-resistive device according to the first embodiment of the present invention.
Figure 8B:
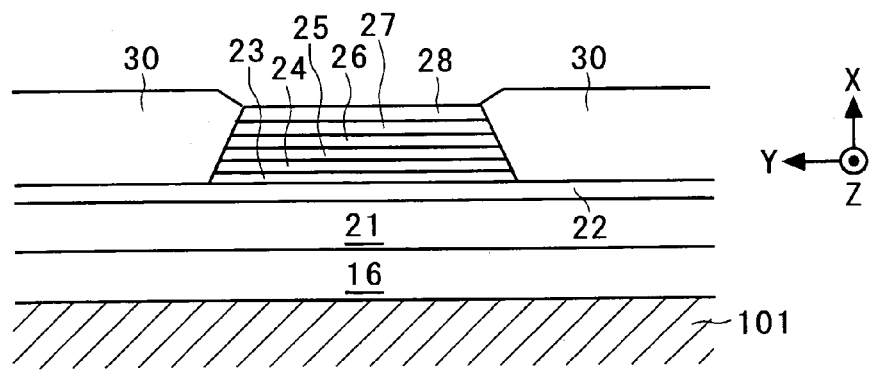

The outline of the wafer process will be described with reference to FIGS. 6 to 9. FIGS. 6 to 9 are diagrams schematically illustrating respective steps which make up the wafer process, wherein FIGS. 6A, 7A, 8A and 9A are general plan views, respectively; FIG. 6B is a general cross-sectional view taken along a line C-D in FIG. 6A; FIG. 7B is a general cross-sectional view taken along a line C-D in FIG. 7A; FIG. 8B is a general cross-sectional view taken along a line E-F in FIG. 8A; and FIG. 9B is a general cross-sectional view taken along a line E-F in FIG. 9A. In FIG. 7A, TW indicates the width of a track defined by the TMR device 2.

Figure 6A:
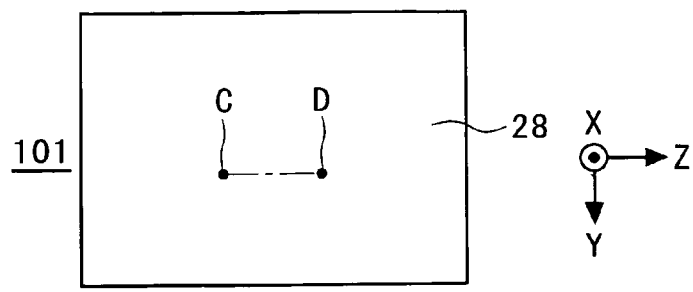
FIGS. 6A and 6B are diagrams schematically illustrating a step in a magnetic head manufacturing method which includes the method of manufacturing a magneto-resistive device according to the first embodiment of the present invention.
Figure 6B:
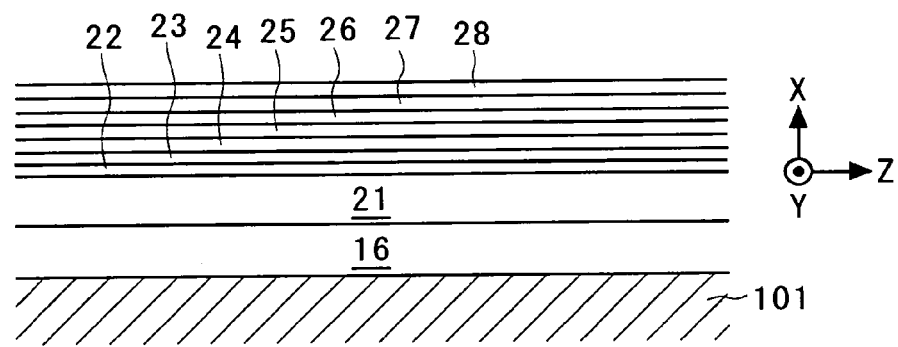

First, in the wafer process, the underlying layer 16, lower electrode 21, lower metal layer 22, lower metal layer 23, pin layer 24, pinned layer 25, tunnel barrier layer 26, free layer 27, and cap layer 28 are sequentially laminated on the wafer (substrate) 101 (FIGS. 6A and 6B). In this event, the lower electrode 21 is formed, for example, by a plating method, while the other layers are formed, for example, by a sputtering method. Subsequently, the substrate in this state is once left in the atmosphere. In this event, an oxide film (not shown) is formed on the top face of the cap layer 28.

Next, the lower metal layer 23, pin layer 24, pinned layer 25, tunnel barrier layer 26, free layer 27, cap layer 28, and the oxide film on the cap layer 28 are partially removed for patterning by first ion milling. Next, the insulating layers 34 and vertical biasing layers 32 are formed in the removed portions by a lift-off method (FIGS. 7A and 7B). The method of forming the insulating layers 34 in this lift-off method will be described in detail later.

Next, the lower metal layer 23, pin layer 24, pinned layer 25, tunnel barrier layer 26, free layer 27, cap layer 28, oxide film (not shown) on the cap layer 28 as mentioned above, insulating layer 34, and vertical biasing layers 32 are partially removed for patterning by second ion milling, while leaving a strip portion which has a necessary width (width in the Y-axis direction) with respect to the height direction of the TMR device 2 and extends in the Z-axis direction by a predetermined distance. Subsequently, the insulating layer 30 is formed in the removed portions by a lift-off method (FIGS. 8A and 8B). The method of forming the insulating layers 30 in this lift-off method will be described in detail later.

Next, the oxide film formed on the top face of the cap layer 28 is removed by dry etching such as sputter etching, ion beam etching or the like in the same vacuum chamber in which the upper metal layer 29 is formed.

Figure 9A:
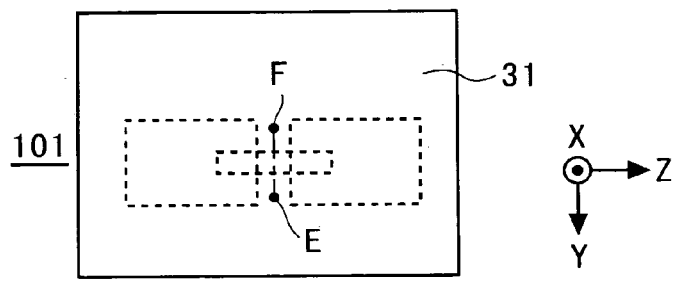
FIGS. 9A and 9B are diagrams schematically illustrating a further step in the magnetic head manufacturing method which includes the method of manufacturing a magneto-resistive device according to the first embodiment of the present invention.
Figure 9B:
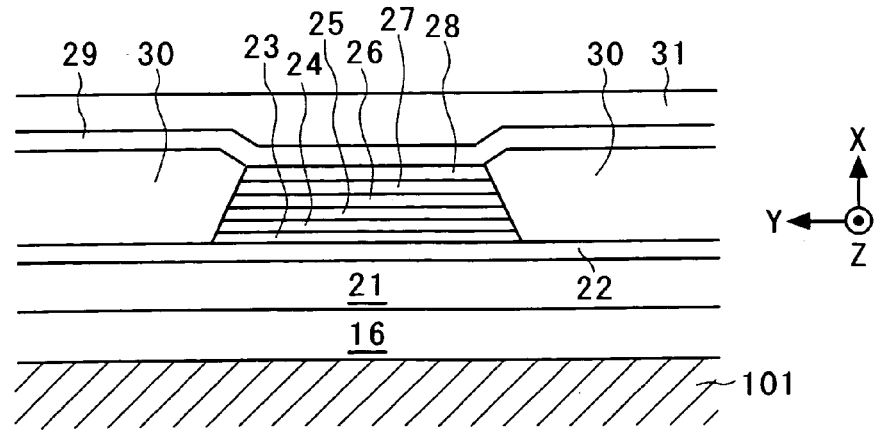

Subsequently, the upper metal layer 29 is formed by a sputtering method or the like, and the upper electrode 31 is formed by a plating method or the like (FIGS. 9A and 9B).

Finally, the gap layer 38, coil layer 37, insulating layer 39, upper magnetic layer 36, and protection layer 40 are formed, and the electrodes 5a-5d and the like are formed. Also, the resulting product is annealed for curing the insulating layer (thermosetting photoresist) 39. By now, the wafer process is completed.

Next, magnetic heads are completed through a known process for the wafer which has undergone the wafer process. Briefly describing, each bar (bar-shaped magnetic head aggregate) having a plurality of magnetic heads arranged in a line on the base is sawed from the wafer. Next, the bar is lapped on its ABS side for setting a throat height, an MR height, and the like for the bar. Next, a protection film 4 is formed on the surface of the ABS side, and rails 11, 12 are formed by etching or the like. Finally, the bar is cut by machining into individual magnetic heads. In this manner, the magnetic heads illustrated in FIGS. 1 to 5 are completed.

Figure 10:
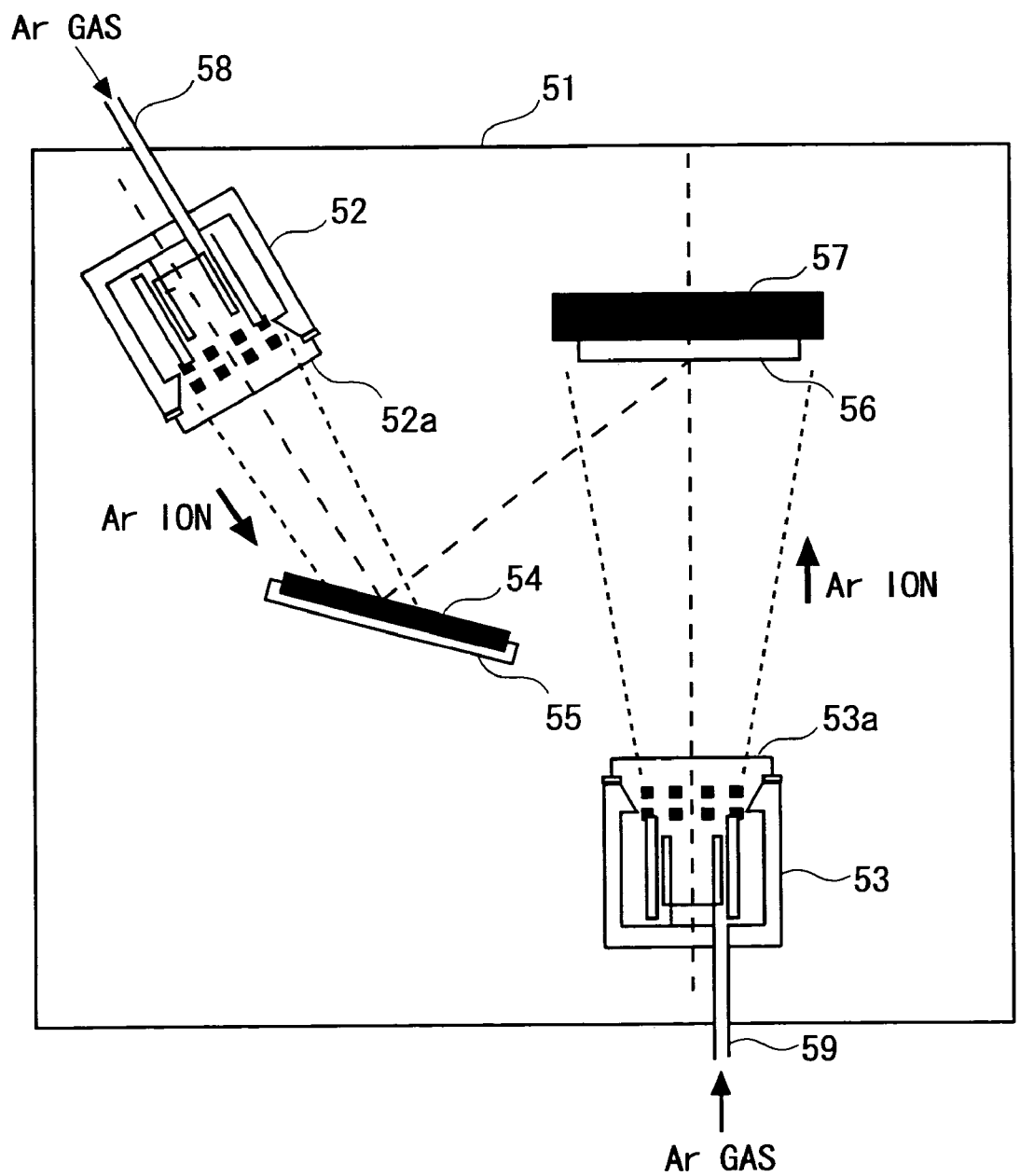
FIG. 10 is a schematic diagram generally illustrating the configuration of an exemplary ion beam deposition system which can be used in an insulating layer deposition step.

Referring now to FIG. 10, description will be made on a step of depositing the insulating layer 34 in the process of forming the insulating layer 34 and vertical biasing layer 32 by the lift-off method described above. FIG. 10 is a schematic diagram generally illustrating the configuration of an exemplary ion beam deposition system which can be used in the step of depositing the insulating layer 34.

In the first embodiment, the insulating layer 34 is formed by depositing the insulating layer 34 while irradiating an ion beam of a gas mainly containing a rare gas toward the wafer immediately before the deposition of the insulating layer 34. Specifically, the deposition of the insulating layer 34 can be carried out, for example, by using an ion beam deposition system illustrated in FIG. 10. In the gas mainly containing a rare gas, the ratio of the flow rate of the introduced rare gas to the total flow rate of the gas introduced is preferably at 85% or more, the ratio is more preferably 90% or more, and the ratio is further more preferably 93% or more. Since the gas mainly containing a rare gas contains the rare gas at high percentage unlike before, the gas may include an oxygen gas.

The ion beam deposition system illustrated in FIG. 10 comprises a chamber 51 decompressed to a vacuum; an ion gun 52 for irradiating a target; an assist gun (ion gun for assistance) 53; a target holder 55 for holding a target 54; and a substrate holder 57 for holding a substrate 56. The ion guns 52, 53 and holders 55, 57 are disposed within the chamber 51, as can be seen in FIG. 10. The ion guns 52, 53 have neutralizers 52a, 53a, respectively. A gas (for example, an Ar gas), which is introduced from a gas introduction pipe 58 to serve as ions irradiated to the target, is ionized by the target irradiating ion gun 52, such that the ions produced thereby are irradiated to the target 54. In this way, atoms of the target 54 are sputtered, so that the atoms are deposited on the substrate 56. In this event, the gas introduced from the gas introduction pipe 59 is simultaneously ionized by the assist gun 53, so that the resulting ions are irradiated toward the substrate 56.

When the insulating layer 34 is deposited using the ion beam deposition system illustrated in FIG. 10, the target 54 made of a material which makes up the insulating layer 34 is held by the target holder 55. For example, when the insulating layer 34 is made of $Al_2O_3$, a target made of $Al_2O_3$ is held by the target holder 55. In addition, the wafer immediately before it is deposited with the insulating layer 34 is held as the substrate 56 by the substrate holder 57. Then, unlike a normal usage of the assist gun 53, a gas mainly containing a rare gas (for example, an Ar gas) is introduced from the gas introduction pipe 59, such that the assist gun 53 irradiates ions of the introduced rare gas toward the substrate 56. The gas introduced from the gas introduction pipe 59 may consist only of the rare gas, or may be a combination of the rare gas and an oxygen gas or the like which is contained in the rare gas and is limited in the introduced flow rate as compared with before.

Also, in the first embodiment, a step of depositing the insulting layer 30 in the process of forming the insulating layer 30 by the lift-off method described above is performed in a manner similar to the step of depositing the insulating layer 34.

As described above, in the first embodiment, the insulating layer 34 as well as the insulating layer 30 are both formed by depositing the associated insulating layer while irradiating an ion beam of a rare gas toward a wafer immediately before the associated insulating layer is deposited, in a state that oxygen is substantially blocked. While such a step is most preferably employed in both the steps of depositing the insulating layer 34 and insulating layer 30 like the first embodiment, the present invention may permit the employment of the foregoing step only for one of the step of depositing the insulating layer 34 and the step of depositing the insulating layer 30. In this event, for depositing the other insulating layer, for example, (a) similar to the aforementioned conventional manufacturing method, for example, when the insulating film is made of $Al_2O_3$, the ion beam deposition system illustrated in FIG. 10 may used, together with $Al_2O_3$ for the target 54 and an oxygen gas introduced from the gas introduction pipe 59, to irradiate oxygen ions toward the substrate 56 by the assist gun 53; or (b) for example, when the insulating layer is made of $Al_2O_3$, the ion beam deposition system illustrated in FIG. 10 may be used, with $Al_2O_3$ selected for the target 54, without introducing any gas from the gas introduction pipe 59.

According to the first embodiment, since the insulating layer 34 and insulating layer 30 are formed in the steps described above, the resulting magneto-resistive device can be reduced in the degradation of characteristics due to the annealing (increased resistance and reduced MR ratio). This fact has been also confirmed by an experiment, later described.

Now, a magnetic disk apparatus according to a second embodiment of the present invention will be described with reference to FIG. 11.

Figure 11:
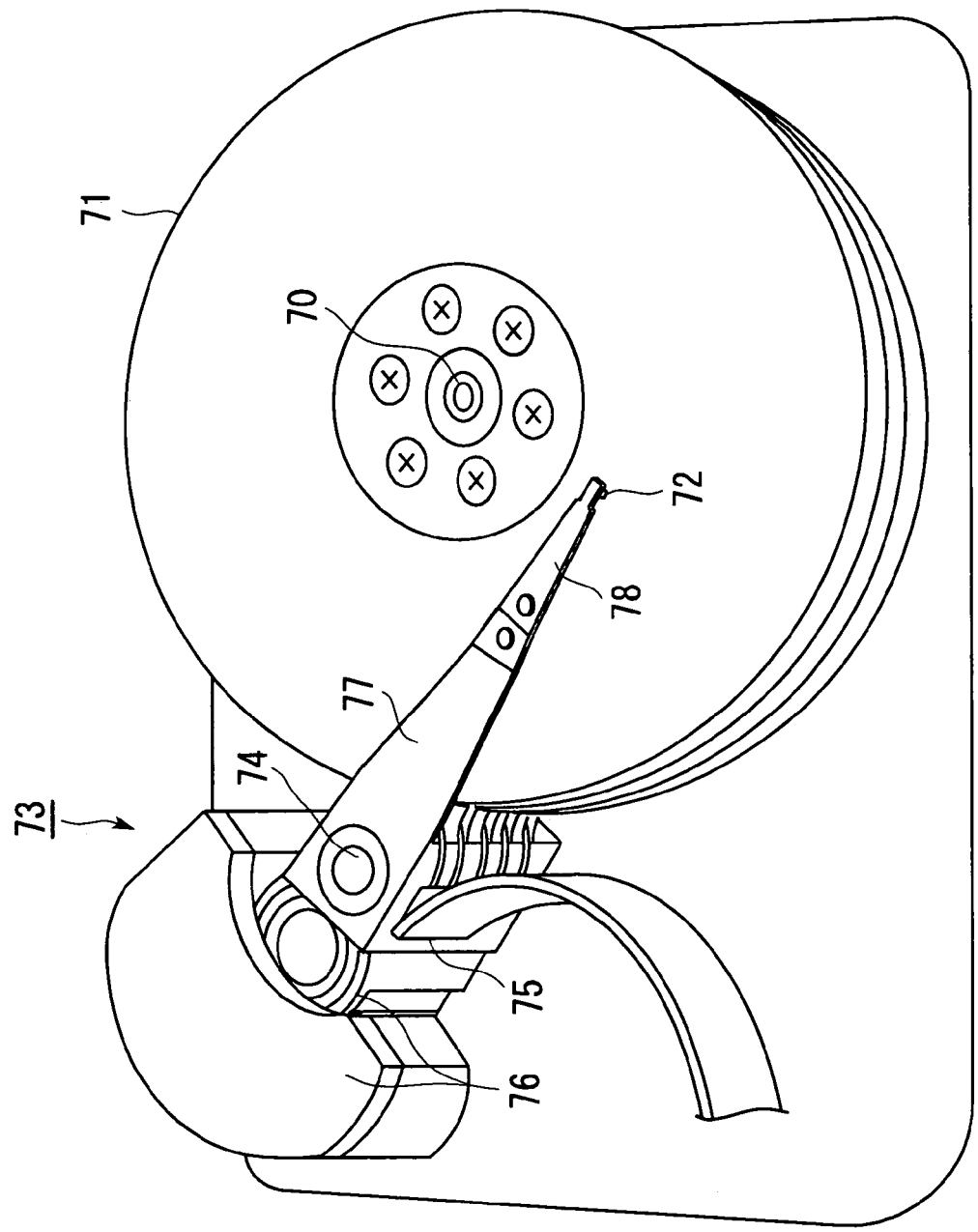
FIG. 11 is a perspective view generally illustrating the structure of a main portion of a magnetic disk apparatus according to a second embodiment of the present invention.

FIG. 11 is a perspective view generally illustrating the configuration of a main portion of a magnetic disk apparatus according to a second embodiment of the present invention.

The magnetic disk apparatus according to the second embodiment comprises magnetic disks 71 rotatably mounted about a shaft 70; magnetic heads 72 each for recording and reproducing information to or from associated one of the magnetic disks 71; and an assembly carriage device 73 for positioning the magnetic head 72 on a track of the magnetic disk 71.

The assembly carriage device 73 mainly comprises a carriage 75 mounted for pivotal movements about a shaft 74; and an actuator 76 comprised, for example, of a voice coil motor (VCM) for rotating the carriage 75.

The carriage 75 is mounted with bases of a plurality of driving arms 77 which are stacked in the direction of the shaft 74. A head suspension assembly 78 is secured at the leading end of each driving arm 77. Each head suspension assembly 78 has the magnetic head 72 mounted on the leading end thereof. Each head suspension assembly 78 is attached to the leading end of the driving arm 77 such that the associated magnetic head 72 opposes the surface of the associated magnetic disk 71.

In the second embodiment, the magnetic disk apparatus comprises the magnetic head illustrated in FIGS. 1 to 5 as the magnetic head 72, which is manufactured by the manufacturing method including the method of manufacturing the magneto-resistive device according to the first embodiment of the present invention described above with reference to FIGS. 6 to 10. Therefore, the magnetic disk apparatus according to the second embodiment can advantageously increase the recording density and the like due to improvement of MR ratio and the like.

A magnetic head similar in structure to the magnetic head illustrated in FIGS. 1 to 5 was manufactured for use as a magnetic head sample 1 in the same manufacturing process as described with reference to FIGS. 6 to 10. Also, magnetic heads identical in structure as the magnetic head sample 1 were manufactured in the same manufacturing steps as the steps of manufacturing the magnetic head sample 1 except for the steps of depositing the insulating layers 34, 30 for use as magnetic head samples 2, 3. The conditions for manufacturing the magnetic head sample 1 were the same as those for manufacturing the magnetic head samples 2, 3 except that the steps of depositing the insulating layers 34, 30 were modified. Components of main layers of the samples 1-3 are as shown in Table 1 below. As can be seen in Table 1, either of the samples 1-3 has the insulating layers 34, 30 made of $Al_2O_3$.

TABLE 1

| Name of Layer and Reference Numeral in Drawings | Composition and Thickness of Layer (When composed of two layers or more, a layer more to the left is positioned lower (near the substrate)) |
|---|---|
| Upper Electrode 31 (serving also as Upper Magnetic Shield) | NiFe(2 μm) |
| Upper Metal Layer 29 | Ta(5 nm) |
| Insulating Layer 30 | $Al_2O_3$(90 nm) |
| Vertical Biasing Layer 32 | CrTi(5 nm)/CoCrPt(30 nm)/Ta(5 nm) |
| Insulating Layer 34 | $Al_2O_3$(5 nm) |
| Cap Layer 28 | Ta(18 nm) |
| Free Layer 27 | CoFe(1 nm)/NiFe(3 nm) |
| Tunnel Barrier Layer 26 | $Al_2O_3$(0.6 nm) |
| Pinned Layer 25 | CoFe(2 nm)/Ru(0.8 nm)/CoFe(3 nm) |
| Pin layer 24 | PtMn(15 nm) |
| Lower Metal Layer 23 | NiFe(2 nm) |
| Lower Metal Layer 22 | Ta(5 nm) |
| Lower Electrode 21 (serving also as Lower Magnetic Shield) | NiFe(2 μm) |

The magnetic head samples 1, 2 correspond to those manufactured by the manufacturing method including the method of manufacturing a magneto-resistive device according to the respective embodiments of the present invention. On the other hand, the sample 3 corresponds to that manufactured by a manufacturing method including the conventional method of manufacturing a magneto-resistive device as a comparative example for comparison with the present invention.

The deposition of the insulating layers 34, 30 during the manufacturing the magnetic head sample 1, as well as the deposition of the insulating layers 34, 30 during the manufacturing of the magnetic heads samples 2, 3 were made using an ion beam deposition system similar to the ion beam deposition system illustrated in FIG. 10, wherein the samples 1-3 were made under the same use conditions except that a part of the conditions (condition of introducing a gas into the assist ion gun 53) was changed for the respective ones.

Specifically, for depositing the insulating layers 34, 30 during the manufacturing the magnetic head sample 1, the chamber 51 was vacuumed to a residual gas pressure of $1 \times 10^{-5}$ Pa, an Ar gas was introduced at a flow rate of 8 sccm from the gas introduction pipe 58 to the target irradiation ion gun 52, and an Ar gas was introduced at a flow rate of 8 sccm from the gas introduction pipe 59 to the assist ion gun 53. On the other hand, for depositing the insulating layers 34, 30 during the manufacturing of the magnetic head sample 2, the chamber 51 was vacuumed to a residual gas pressure of $1 \times 10^{-5}$ Pa, an Ar gas was introduced at a flow rate of 8 sccm from the gas introduction pipe 58 to the target irradiating ion gun 52, and an Ar gas and an oxygen gas were introduced at a flow rate of 7.5 sccm and 0.5 sccm, respectively, from the gas introduction pipe 59 to the assist ion gun 53. Further, for depositing the insulating layers 34, 30 during the manufacturing of the magnetic head sample 3, the chamber 51 was vacuumed to a residual gas pressure of $1 \times 10^{-5}$ Pa, an Ar gas was introduced at a flow rate of 8 sccm from the gas introduction pipe 58 to the target irradiation ion gun 52, and an Ar gas and an oxygen gas were introduced at 6 sccm and 2 sccm, respectively, from the gas introduction pipe 59 to the assist ion gun 53.

As described above, the ratio of the flow rate of the introduced Ar gas to the total flow rate of the gas introduced into the assist ion gun 53 was chosen to be 100% for the sample 1; 93.75% (=7.5/8) for the sample 2; and 75% (=6/8) for the sample 3. While the oxygen gas is contained, other than the Ar gas, in the gas introduced into the assist ion gun 53 both for the sample 2 and sample 3, the gas introduced into the assist ion gun 53 for the sample 2 contains a not-so-large amount of oxygen gas, and so mainly contains the Ar gas, whereas the gas used for the sample 3 contains a large amount of oxygen gas but does not mainly contain the Ar gas.

During the deposition of the insulating layers 34, 30 for manufacturing any of the magnetic head samples 1-3, the target irradiating ion gun 52 was used with an accelerating voltage set at 1500 V, an accelerating current set at 400 mA, and the current of the neutralizer 52a set at 600 mA, and the assist ion gun 53 was used with an accelerating voltage set at 70 V, an accelerating current set at 75 mA, and the current of the neutralizer 53a set at 375 mA.

During the manufacturing of the samples 1-3, annealing was performed for two hours at 250° C. in order to cure the insulating layer (thermosetting photoresist) 39.

Then, the resistance and MR ratio of the previously fabricated TMR device 2 were measured before and after the annealing for each of the samples 1-3. The result of the measurement is shown in Table 2 below.

TABLE 2

|  | Before Annealing | | After Annealing | | Shift | Shift |
| --- | --- | --- | --- | --- | --- | --- |
|  | Resistance (Ω) | MR Ratio (%) | Resistance (Ω) | MR Ratio (%) | Ratio of Resistance (%) | Ratio of MR ratio (%) |
| Sample 1 | 50.1 | 27.0 | 51.9 | 26.5 | 3.6 | −1.9 |
| Sample 2 | 48.5 | 27.0 | 50.2 | 26.3 | 3.5 | −2.6 |
| Sample 3 | 48.9 | 20.7 | 89.7 | 17.5 | 83.4 | −15.5 |

Also, for each of the samples 1-3, a shift ration of the resistance and a shift ratio of the MR ratio were calculated from the measured resistances and MR ratios before and after the annealing. These shift ratios are also shown in Table 2 above. The shift ratio was calculated in accordance with the following equation:

Shift Ratio={(Value after Annealing−Value before Annealing)/Value before Annealing}×100[%]

As can be seen from Table 2, the TMR device 2 has a significantly increased resistance and a significantly reduced MR ratio after the annealing, as compared with those before the annealing in the sample 3 which involved the irradiation of the substrate with the ions of the gas composed of the Ar gas and a large amount of oxygen gas in the Ar gas from the ion gun 53 during the deposition of the insulating layers 34, 30, whereas the TMR device hardly changes in resistance and MR ratio before and after the annealing in the samples 1, 2 which involved the irradiation of the substrate with ions of only the Ar gas or ions of the gas composed of the Ar gas and only a trace of oxygen gas included in the Ar gas during the deposition of the insulating layers 34, 30, thus limiting a degradation in the characteristics of the TMR device 2 otherwise caused by the annealing.

It has been also confirmed that the insulating performance of the insulating layers 34, 30 in the samples 1, 2 are at the same level as the insulating layers 34, 30 of the sample 3, and do not at all interfere with the operation of the TMR device 2.

While several embodiments of the present invention and examples have been described above, the present invention is not limited to those.

For example, while the foregoing embodiments have shown examples in which the present invention is applied to a method of manufacturing a TMR device, the present invention can be applied as well to a method of manufacturing a magneto-resistive device which has a CPP structure such as CPP-GMR.

Also, while the foregoing embodiments have shown examples in which the present invention is applied to a magnetic head that employs a magneto-resistive device, the present invention can be applied as well to a device having a structure in which an insulating layer is in contact with the periphery of a magneto-resistive layer, for example, MRAM, magnetic detector, and the like.

As described above, the present invention can provide a method of manufacturing a magneto-resistive device which can reduce the deterioration in the device characteristics due to annealing, as well as a magnetic head, a head suspension assembly, and a magnetic disk apparatus.

What is claimed is:

1. A method of manufacturing a magneto-resistive device comprising the steps of:
   depositing constituent layers which make up a magneto-resistive layer on a base;
   patterning one or more layers of said constituent layers; and
   forming an insulating layer in a region in which said one or more layers of said constituent layers have been removed by the patterning;
   wherein said step of forming said insulating layer includes the step of depositing said insulating layer while irradiating an ion beam of a gas mainly containing a rare gas toward said base after said step of patterning;
   wherein said step of depositing said insulating layer includes the step of using an ion beam deposition system having a first gun and a second gun so as to irradiate a target irradiating ion beam toward a target of said insulating layer from said first ion gun while irradiating the ion beam of the gas mainly containing the rare gas toward said base from said second ion gun.

2. The method of manufacturing a magneto-resistive device according to claim 1, wherein said insulating layer is made of an oxide.

3. The method of manufacturing a magneto-resistive device according to claim 1, wherein said magneto-resistive device includes an effective region effectively involved in detection of magnetism in said magneto-resistive layer, said effective region being a region in which a current flows in a direction substantially perpendicular to film surface in said magneto-resistive layer.

4. The method of manufacturing a magneto-resistive device according to claim 3, wherein said magneto-resistive layer includes a tunnel barrier layer formed on one surface side of a free layer, a pinned layer formed on one surface side of said tunnel barrier layer opposite to said free layer, and a pin layer formed on one surface side of said pinned layer opposite to said tunnel barrier layer.

* * * * *